United States Patent
Benisty (10) Patent No.: US 11,461,052 B1
(45) Date of Patent: Oct. 4, 2022

(54) STORAGE SYSTEM WITH DUAL SUBMISSION QUEUE DOORBELL REGISTERS AND METHOD FOR USE IN A MULTI-TENANT SYSTEM

(71) Applicant: Western Digital Technologies, Inc., San Jose, CA (US)

(72) Inventor: Shay Benisty, Beer Sheva (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/225,385

(22) Filed: Apr. 8, 2021

(51) Int. Cl.
  *G06F 3/06* (2006.01)
  *G06F 9/455* (2018.01)

(52) U.S. Cl.
  CPC ............ *G06F 3/0659* (2013.01); *G06F 3/061* (2013.01); *G06F 3/0664* (2013.01); *G06F 3/0673* (2013.01); *G06F 9/45558* (2013.01); *G06F 2009/45583* (2013.01)

(58) Field of Classification Search
  CPC ...... G06F 3/0659; G06F 3/061; G06F 3/0664; G06F 3/0673; G06F 9/45558; G06F 2009/45583
  USPC .................................................. 711/154, 100
  See application file for complete search history.

(56) References Cited

U.S. PATENT DOCUMENTS

| | | | |
|---|---|---|---|
| 10,742,737 B2 | 8/2020 | Choi et al. | |
| 2014/0189212 A1* | 7/2014 | Slaight | G06F 13/102 710/22 |
| 2016/0224248 A1* | 8/2016 | Choi | G06F 9/45558 |
| 2019/0166201 A1* | 5/2019 | Choi | G06F 3/067 |
| 2020/0097192 A1* | 3/2020 | de Kort | G06F 3/0637 |
| 2020/0356396 A1* | 11/2020 | Bert | G06F 9/45558 |

* cited by examiner

*Primary Examiner* — David Yi
*Assistant Examiner* — Zubair Ahmed
(74) *Attorney, Agent, or Firm* — Crowell & Moring LLP (57) ABSTRACT

A storage system has two submission queue doorbell registers associated with a submission queue in a host. The storage system fetches and executes a command from the submission queue only in response to both submission queue doorbell registers being written. The second submission queue doorbell register may be visible (and directly written to) by the host or invisible (and indirectly written to) by the host. The use of two submission queue doorbell registers for a single submission queue can be used as a protection mechanism to protect an administration command submission queue of a child controller in a multiple physical function Non-Volatile Memory Express (NVMe) device (MFND).

20 Claims, 9 Drawing Sheets

STORAGE SYSTEM WITH DUAL SUBMISSION QUEUE DOORBELL REGISTERS AND METHOD FOR USE IN A MULTI-TENANT SYSTEM

BACKGROUND

The present disclosure is directed to memory systems and, more particularly, to memory systems that have submission queue doorbell registers associated with a host submission queue.

In some environments, a storage system and host operate under the Non-Volatile Memory Express (NVMe) specification. NVMe is based on a paired submission and completion queue mechanism. Commands are placed by host software into the submission queue, and completions are placed into an associated completion queue by the controller of the storage system. In operation, the host writes a command to the submission queue and then writes to a submission queue doorbell register in the storage system to alert the storage system to the fact that the host has queued a command in the submission queue. Once alerted, the storage system fetches and executes the command from the submission queue.

DETAILED DESCRIPTION

The following embodiments are generally related to a storage system with dual submission queue doorbell registers and method for use in a multi-tenant system. In one embodiment, a storage system is provided comprising a non-volatile memory and a controller comprising first and second submission queue doorbell registers associated with a submission queue in a host. The controller is configured to fetch and execute a command from the submission queue in the host only in response to both the first and second submission queue doorbell registers being written. In another embodiment, a method for use of the storage system is provided. In yet another embodiment, a storage system is provided comprising: first and second submission queue doorbell registers associated with a submission queue and means for fetching and executing a command from the submission queue in the host only in response to both the first and second submission queue doorbell registers being written. Other embodiments are provided, and each of these embodiments can be used alone or in combination.

Figures 1A, 1B:
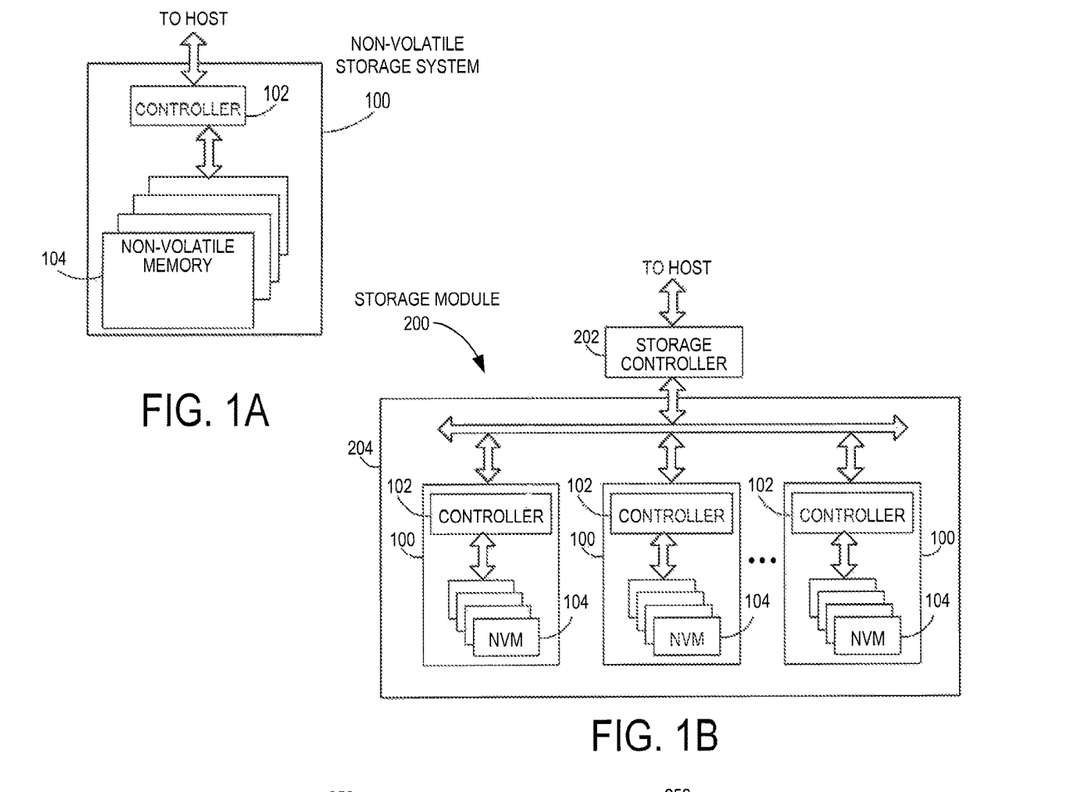
FIG. 1A is a block diagram of a non-volatile storage system of an embodiment.
FIG. 1B is a block diagram illustrating a storage module of an embodiment.
Figure 1C:
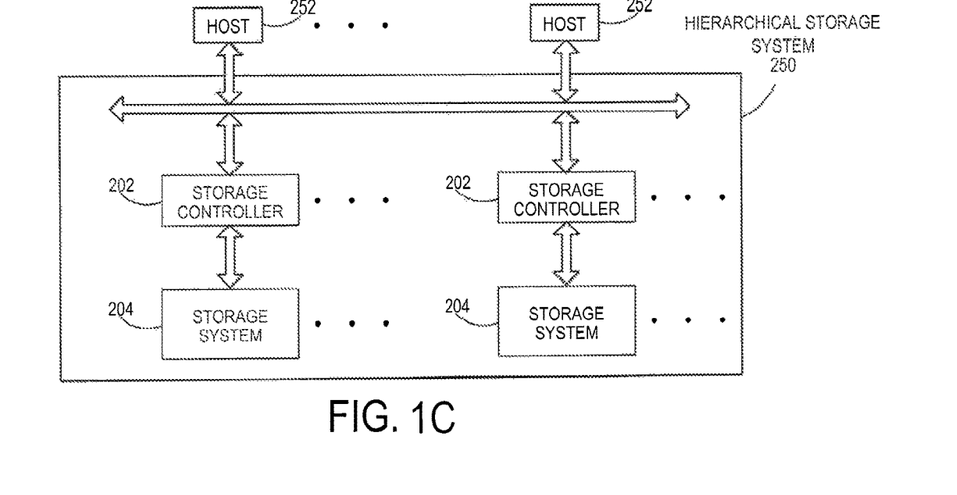
FIG. 1C is a block diagram illustrating a hierarchical storage system of an embodiment.

Turning now to the drawings, storage systems suitable for use in implementing aspects of these embodiments are shown in FIGS. 1A-1C. FIG. 1A is a block diagram illustrating a non-volatile storage system 100 (sometimes referred to herein as a storage device or just device) according to an embodiment of the subject matter described herein. Referring to FIG. 1A, non-volatile storage system 100 includes a controller 102 and non-volatile memory that may be made up of one or more non-volatile memory die 104. As used herein, the term die refers to the collection of non-volatile memory cells, and associated circuitry for managing the physical operation of those non-volatile memory cells, that are formed on a single semiconductor substrate. Controller 102 interfaces with a host system and transmits command sequences for read, program, and erase operations to non-volatile memory die 104.

The controller 102 (which may be a non-volatile memory controller (e.g., a flash, resistive random-access memory (ReRAM), phase-change memory (PCM), or magnetoresistive random-access memory (MRAM) controller)) can take the form of processing circuitry, a microprocessor or processor, and a computer-readable medium that stores computer-readable program code (e.g., firmware) executable by the (micro)processor, logic gates, switches, an application specific integrated circuit (ASIC), a programmable logic controller, and an embedded microcontroller, for example. The controller 102 can be configured with hardware and/or firmware to perform the various functions described below and shown in the flow diagrams. Also, some of the components shown as being internal to the controller can also be stored external to the controller, and other components can be used. Additionally, the phrase "operatively in communication with" could mean directly in communication with or indirectly (wired or wireless) in communication with through one or more components, which may or may not be shown or described herein.

As used herein, a non-volatile memory controller is a device that manages data stored on non-volatile memory and communicates with a host, such as a computer or electronic device. A non-volatile memory controller can have various functionality in addition to the specific functionality described herein. For example, the non-volatile memory controller can format the non-volatile memory to ensure the memory is operating properly, map out bad non-volatile memory cells, and allocate spare cells to be substituted for future failed cells. Some part of the spare cells can be used to hold firmware to operate the non-volatile memory controller and implement other features. In operation, when a host needs to read data from or write data to the non-volatile memory, it can communicate with the non-volatile memory controller. If the host provides a logical address to which data is to be read/written, the non-volatile memory controller can convert the logical address received from the host to a physical address in the non-volatile memory. (Alternatively, the host can provide the physical address.) The non-volatile memory controller can also perform various memory management functions, such as, but not limited to, wear leveling (distributing writes to avoid wearing out specific blocks of memory that would otherwise be repeatedly written to) and garbage collection (after a block is full, moving only the valid pages of data to a new block, so the full block can be erased and reused). Also, the structure for the "means" recited in the claims can include, for example, some or all of the structures of the controller described herein, programmed or manufactured as appropriate to cause the controller to operate to perform the recited functions.

Non-volatile memory die 104 may include any suitable non-volatile storage medium, including resistive random-access memory (ReRAM), magnetoresistive random-access memory (MRAM), phase-change memory (PCM), NAND flash memory cells and/or NOR flash memory cells. The memory cells can take the form of solid-state (e.g., flash) memory cells and can be one-time programmable, few-time programmable, or many-time programmable. The memory cells can also be single-level cells (SLC), multiple-level cells (MLC), triple-level cells (TLC), or use other memory cell level technologies, now known or later developed. Also, the memory cells can be fabricated in a two-dimensional or three-dimensional fashion.

The interface between controller 102 and non-volatile memory die 104 may be any suitable flash interface, such as Toggle Mode 200, 400, or 800. In one embodiment, storage system 100 may be a card based system, such as a secure digital (SD) or a micro secure digital (micro-SD) card. In an alternate embodiment, storage system 100 may be part of an embedded storage system.

Although, in the example illustrated in FIG. 1A, non-volatile storage system 100 (sometimes referred to herein as a storage module) includes a single channel between controller 102 and non-volatile memory die 104, the subject matter described herein is not limited to having a single memory channel. For example, in some storage system architectures (such as the ones shown in FIGS. 1B and 1C), 2, 4, 8 or more memory channels may exist between the controller and the memory device, depending on controller capabilities. In any of the embodiments described herein, more than a single channel may exist between the controller and the memory die, even if a single channel is shown in the drawings.

FIG. 1B illustrates a storage module 200 that includes plural non-volatile storage systems 100. As such, storage module 200 may include a storage controller 202 that interfaces with a host and with storage system 204, which includes a plurality of non-volatile storage systems 100. The interface between storage controller 202 and non-volatile storage systems 100 may be a bus interface, such as a serial advanced technology attachment (SATA), peripheral component interconnect express (PCIe) interface, or double-data-rate (DDR) interface. Storage module 200, in one embodiment, may be a solid state drive (SSD), or non-volatile dual in-line memory module (NVDIMM), such as found in server PC or portable computing devices, such as laptop computers, and tablet computers.

FIG. 1C is a block diagram illustrating a hierarchical storage system. A hierarchical storage system 250 includes a plurality of storage controllers 202, each of which controls a respective storage system 204. Host systems 252 may access memories within the storage system via a bus interface. In one embodiment, the bus interface may be a Non-Volatile Memory Express (NVMe) or fiber channel over Ethernet (FCoE) interface. In one embodiment, the system illustrated in FIG. 1C may be a rack mountable mass storage system that is accessible by multiple host computers, such as would be found in a data center or other location where mass storage is needed.

Figure 2A:
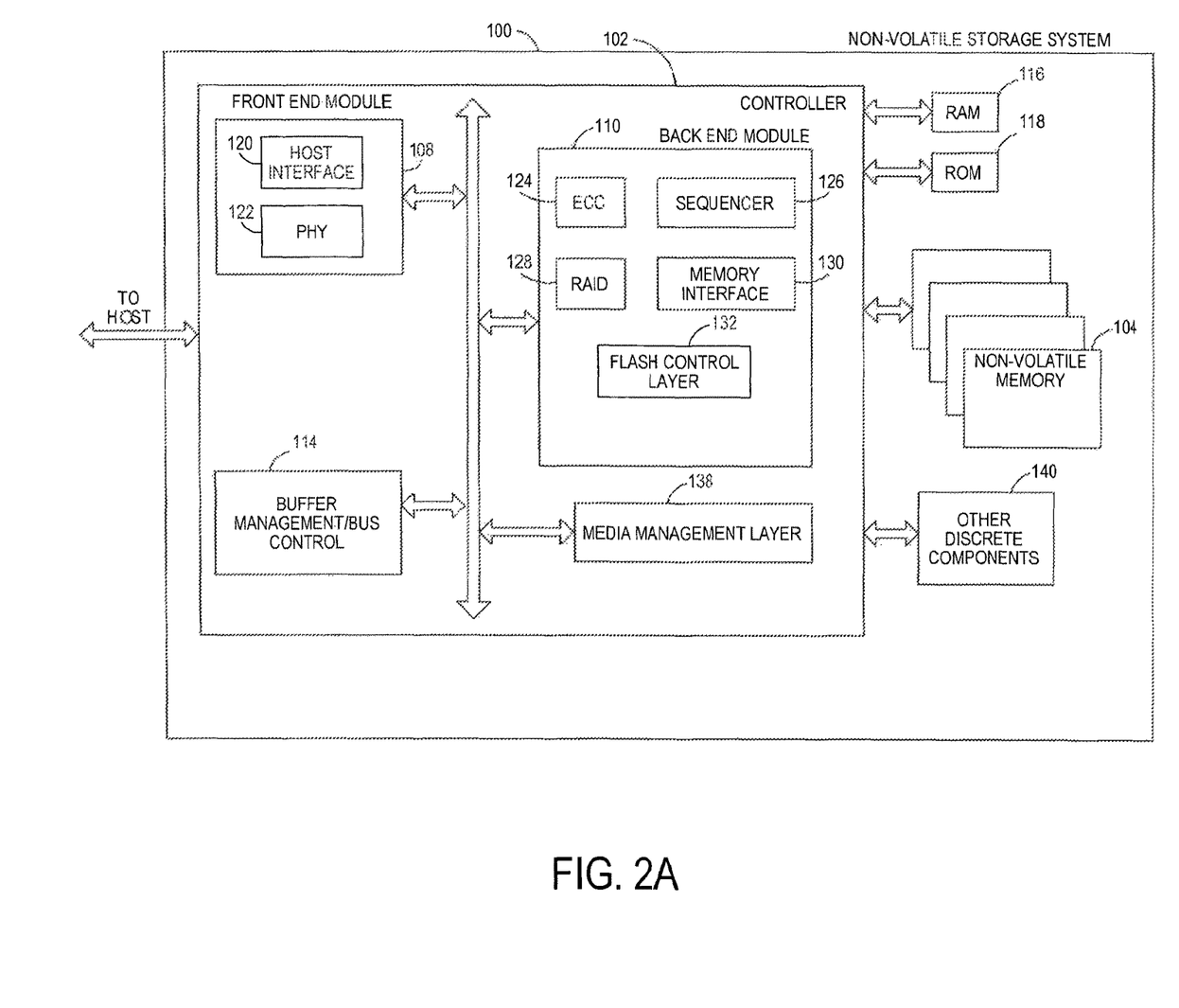
FIG. 2A is a block diagram illustrating components of the controller of the non-volatile storage system illustrated in FIG. 1A according to an embodiment.

FIG. 2A is a block diagram illustrating components of controller 102 in more detail. Controller 102 includes a front end module 108 that interfaces with a host, a back end module 110 that interfaces with the one or more non-volatile memory die 104, and various other modules that perform functions which will now be described in detail. A module may take the form of a packaged functional hardware unit designed for use with other components, a portion of a program code (e.g., software or firmware) executable by a (micro)processor or processing circuitry that usually performs a particular function of related functions, or a self-contained hardware or software component that interfaces with a larger system, for example. The controller 102 may sometimes be referred to herein as a NAND controller or a flash controller, but it should be understood that the controller 102 can be used with any suitable memory technology, example of some of which are provided below.

Referring again to modules of the controller 102, a buffer manager/bus controller 114 manages buffers in random access memory (RAM) 116 and controls the internal bus arbitration of controller 102. A read only memory (ROM) 118 stores system boot code. Although illustrated in FIG. 2A as located separately from the controller 102, in other embodiments one or both of the RAM 116 and ROM 118 may be located within the controller. In yet other embodiments, portions of RAM and ROM may be located both within the controller 102 and outside the controller.

Front end module 108 includes a host interface 120 and a physical layer interface (PHY) 122 that provide the electrical interface with the host or next level storage controller. The choice of the type of host interface 120 can depend on the type of memory being used. Examples of host interfaces 120 include, but are not limited to, SATA, SATA Express, serially attached small computer system interface (SAS), Fibre Channel, universal serial bus (USB), PCIe, and NVMe. The host interface 120 typically facilitates transfer for data, control signals, and timing signals.

Back end module 110 includes an error correction code (ECC) engine 124 that encodes the data bytes received from the host, and decodes and error corrects the data bytes read from the non-volatile memory. A command sequencer 126 generates command sequences, such as program and erase command sequences, to be transmitted to non-volatile memory die 104. A RAID (Redundant Array of Independent Drives) module 128 manages generation of RAID parity and recovery of failed data. The RAID parity may be used as an additional level of integrity protection for the data being written into the memory device 104. In some cases, the RAID module 128 may be a part of the ECC engine 124. A memory interface 130 provides the command sequences to non-volatile memory die 104 and receives status information from non-volatile memory die 104. In one embodiment, memory interface 130 may be a double data rate (DDR) interface, such as a Toggle Mode 200, 400, or 800 interface. A flash control layer 132 controls the overall operation of back end module 110.

The storage system 100 also includes other discrete components 140, such as external electrical interfaces, external RAM, resistors, capacitors, or other components that may interface with controller 102. In alternative embodiments, one or more of the physical layer interface 122, RAID module 128, media management layer 138 and buffer management/bus controller 114 are optional components that are not necessary in the controller 102.

Figure 2B:
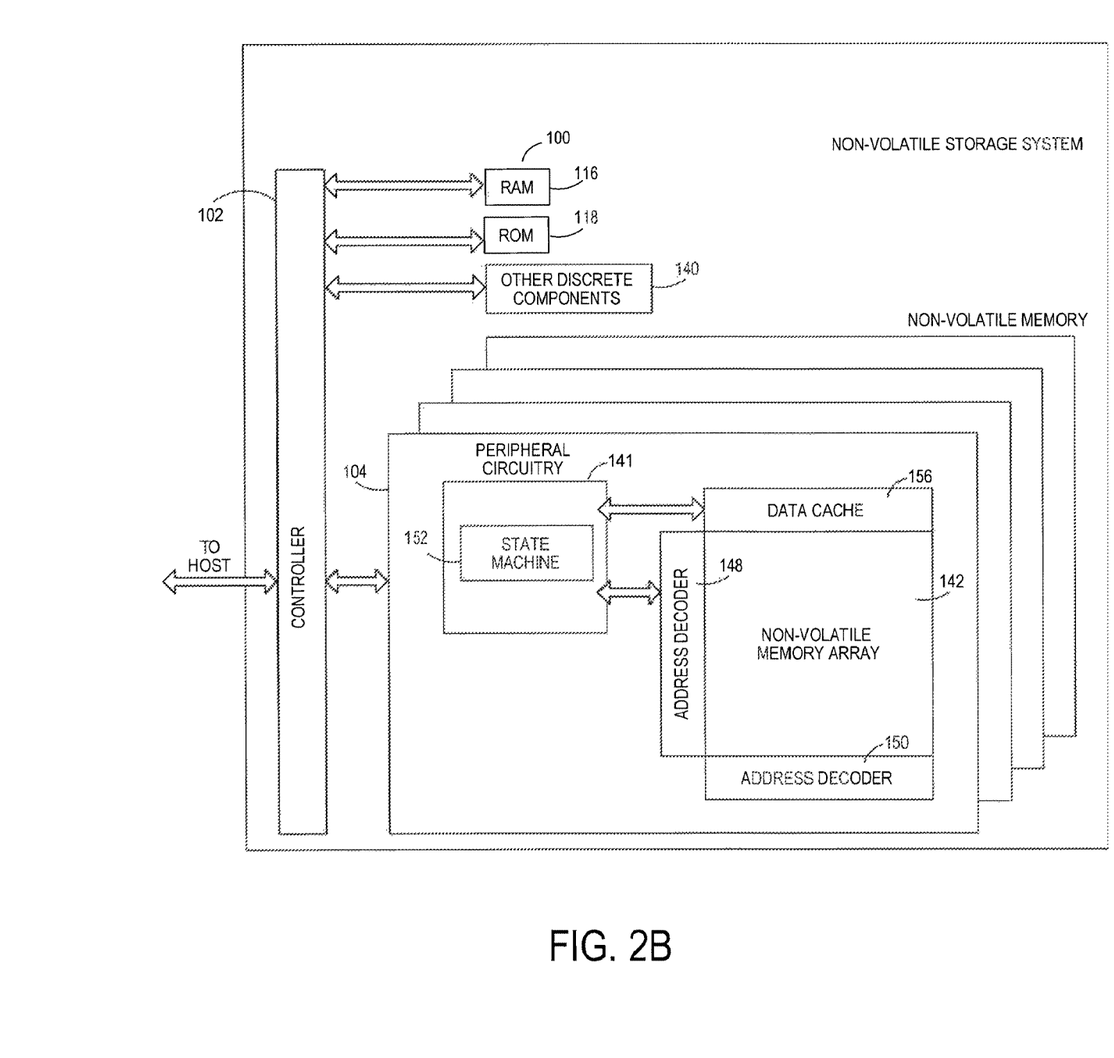
FIG. 2B is a block diagram illustrating components of the non-volatile storage system illustrated in FIG. 1A according to an embodiment.

FIG. 2B is a block diagram illustrating components of non-volatile memory die 104 in more detail. Non-volatile memory die 104 includes peripheral circuitry 141 and non-volatile memory array 142. Non-volatile memory array 142 includes the non-volatile memory cells used to store data. The non-volatile memory cells may be any suitable non-volatile memory cells, including ReRAM, MRAM, PCM, NAND flash memory cells and/or NOR flash memory cells in a two dimensional and/or three dimensional configuration. Non-volatile memory die 104 further includes a data cache 156 that caches data. Peripheral circuitry 141 includes a state machine 152 that provides status information to the controller 102.

Returning again to FIG. 2A, the flash control layer 132 (which will be referred to herein as the flash translation layer (FTL) or, more generally, the "media management layer," as the memory may not be flash) handles flash errors and interfaces with the host. In particular, the FTL, which may be an algorithm in firmware, is responsible for the internals of memory management and translates writes from the host into writes to the memory 104. The FTL may be needed because the memory 104 may have limited endurance, may only be written in multiples of pages, and/or may not be written unless it is erased as a block. The FTL understands these potential limitations of the memory 104, which may not be visible to the host. Accordingly, the FTL attempts to translate the writes from host into writes into the memory 104.

The FTL may include a logical-to-physical address (L2P) map (sometimes referred to herein as a table or data structure) and allotted cache memory. In this way, the FTL translates logical block addresses ("LBAs") from the host to physical addresses in the memory 104. The FTL can include other features, such as, but not limited to, power-off recovery (so that the data structures of the FTL can be recovered in the event of a sudden power loss) and wear leveling (so that the wear across memory blocks is even to prevent certain blocks from excessive wear, which would result in a greater chance of failure).

Figure 3:
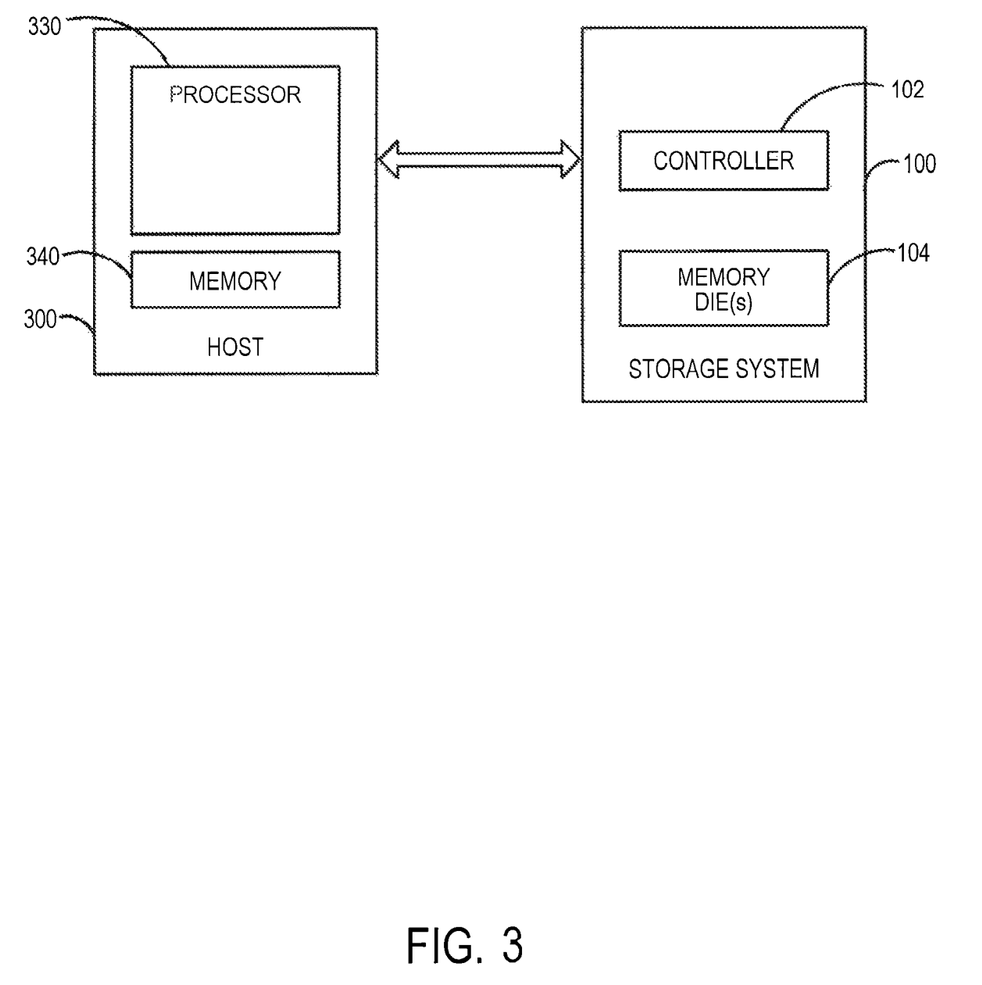
FIG. 3 is a diagram of a host and a storage system of an embodiment.

Turning again to the drawings, FIG. 3 is a block diagram of a host 300 and storage system (sometimes referred to herein as a device) 100 of an embodiment. The host 300 can take any suitable form, including, but not limited to, a computer, a mobile phone, a digital camera, a tablet, a wearable device, a digital video recorder, a surveillance system, etc. The host 300 comprises a processor 330 that is configured to send data (e.g., initially stored in the host's memory 340) to the storage system 100 for storage in the storage system's memory 104.

Figure 4:
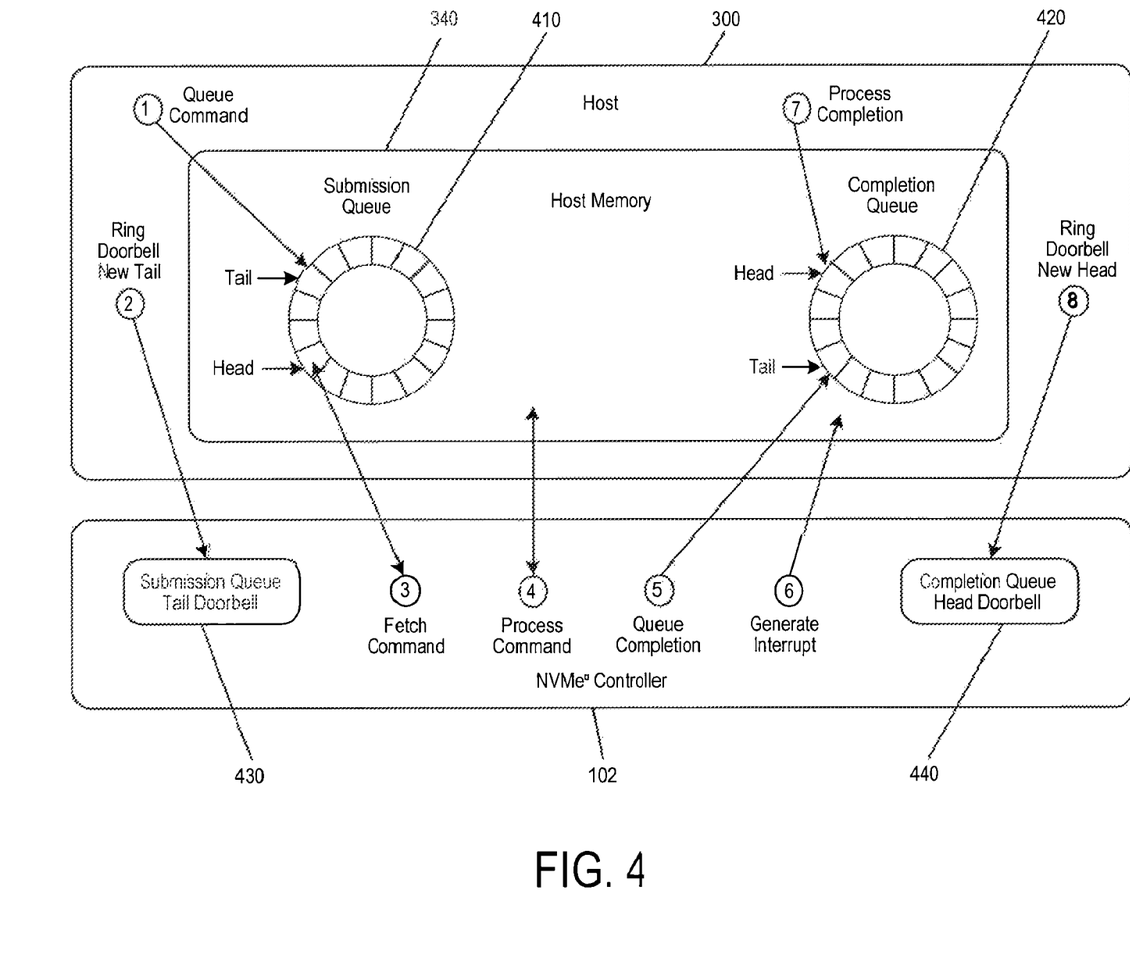
FIG. 4 is a diagram of a host and a storage system of an embodiment that operate under the Non-Volatile Memory Express (NVMe) specification.

In one embodiment, the storage system 100 and host 300 operate under the Non-Volatile Memory Express (NVMe) specification. FIG. 4 is a diagram of an example system of an embodiment. It should be noted that this is merely one example, and other implementations can be used. As shown in FIG. 4, in this embodiment, the memory 340 in the host 300 comprises a submission queue 410 paired with a completion queue 420. Also, the controller 102 in the storage system 100 comprises a submission queue tail doorbell register 430 and a completion queue head doorbell register 440. The operation of these components will be explained below.

NVMe is based on a paired submission and completion queue mechanism. Commands are placed by host software into the submission queue (SQ) 410. Completions are placed into the associated completion queue (CQ) 420 by the controller 102 of the storage system 100. In general, submission and completion queues 410, 420 are allocated in the host memory 340. In one implementation, the submission queues and completion queues 410, 420 may have a 1:1 correlation, and in another implementation, the submission queues 410 and completion queues 420 do not have a 1:1 correlation.

For initialization, the host 300 may notify the storage system 100 of the submission queue(s) 410 and completion queue(s) 420 by sending information, such as the base address for each queue 410, 420 to the storage system 100. In that regard, each submission queue 410 has a corresponding completion queue 420. When the submission queue 410 and the completion queue 420 are resident in the host 300, the host 300 can send information to the storage system 100 in order for the storage system 100 to determine the locations of the submission queue 410 and the completion queue 420 in the host 300. In a specific implementation, the host 300 sends a command indicating the creation of the submission queue 410 and the completion queue 420.

The submission queue 410 may be based on a ring buffer, with a head pointer and a tail pointer. After creating the submission queue(s) 410 and notifying the storage system 100 about the created submission queue(s) 410, the host 300 can write a command (or several commands) to the submission queue 410 (act 1). In one implementation, the storage system 100 is unaware that the host 300 has updated the submission queue, since the host 300 updated its own memory 340. The host 300 can write to a submission queue tail doorbell register 430 in the storage system 100 to signal to the storage system 100 that the host 300 queued one or more commands in this specific submission queue 410 (act 2). The writing to the submission queue tail doorbell register 430 may take one of several forms. In one way, the host 300 indicates a new tail for the submission queue 410, thereby indicating the number of commands written to the submission queue 410. Thus, since the storage system 100 is aware of the base address for the submission queue 410, the storage system 100 only needs to know the tail address to indicate the number of new commands written to the submission queue 410. After a command (or a set of commands) is processed, the storage system 100 then sets the new head of the submission queue 410 accordingly, so that the tail pointer may represent an "offset" from the head pointer. In another way, the host 300 indicates a number of commands written to the submission queue 410. In practice, each submission queue 410 has a corresponding submission queue tail doorbell register 430 in the storage system 100, so that when the host 300 updates a particular doorbell register (correlated to a particular submission queue), the storage system 100 can determine, based on the doorbell register, which particular submission queue has been updated.

After the storage system is notified of command(s) on the submission queue 410 and before the storage system 100 fetches the command(s), the storage system 100 is aware that there are command(s) pending in the submission queue 410. In the general case, there may be several submission queues (with potentially many pending commands in the several submission queues). Thus, the storage system controller 102 may arbitrate between the various submission queues to select the particular submission queue from which to fetch the command(s).

Responsive to determining which particular submission queue 410 from which to fetch the command(s), the storage system 100 fetches the command(s) from the particular submission queue 410 (act 3). In practice, the storage system 100 may access the base address of the particular submission queue 410 plus the pointer on the current head pointer implemented in the host 300.

The storage system 100 then processes the command (e.g., by parsing the command and determining the steps to execute the command (e.g., read/write/etc.)) (act 4). After completing the data transfer associated with the command, the storage system controller 102 sends a completion message to the relevant completion queue 420 (act 5). At the initialization phase, the host 300 associates submission queues 410 with completion queues 420, so that the host 300 is aware of commands that are completed in the submission queue 410 based on which completion queue 420 the storage system 100 writes to. The completion message may contain information as to the processing of the command(s), such as whether the command was completed successfully or whether there was an error when executing the command.

At this point, the host 300 is unaware that the storage system 100 posted to the completion queue 420. This is due to the storage system 100 causing data to be written to the completion queue 420. In that regard, the storage system 100 can notify the host 300 that there has been an update to the completion queue. In particular, the storage system 100 posts an interrupt to the host 300 (act 6). Responsive to receiving the interrupt, the host 300 determines that there are one or more completion entries pending for the host 300 in this completion queue 420 and processes the entries in the completion queue 420. After the host 300 processes the entries from the completion queue, the host 300 notifies the storage system 100 of the entries that the host 300 processed from the completion queue 420 (act 7). This may be performed by updating a completion queue head doorbell register 440 indicative to the storage system 100 that the host 300 processed one or more entries from the completion queue 420. Responsive to updating the completion queue head doorbell register 440, the storage system 100 updates the head of the completion queue 420 (act 8). Given the new head, the storage system 100 is aware as to which entries in the completion queue 420 have already been processed by the host 300 and may be overwritten.

Figure 5:
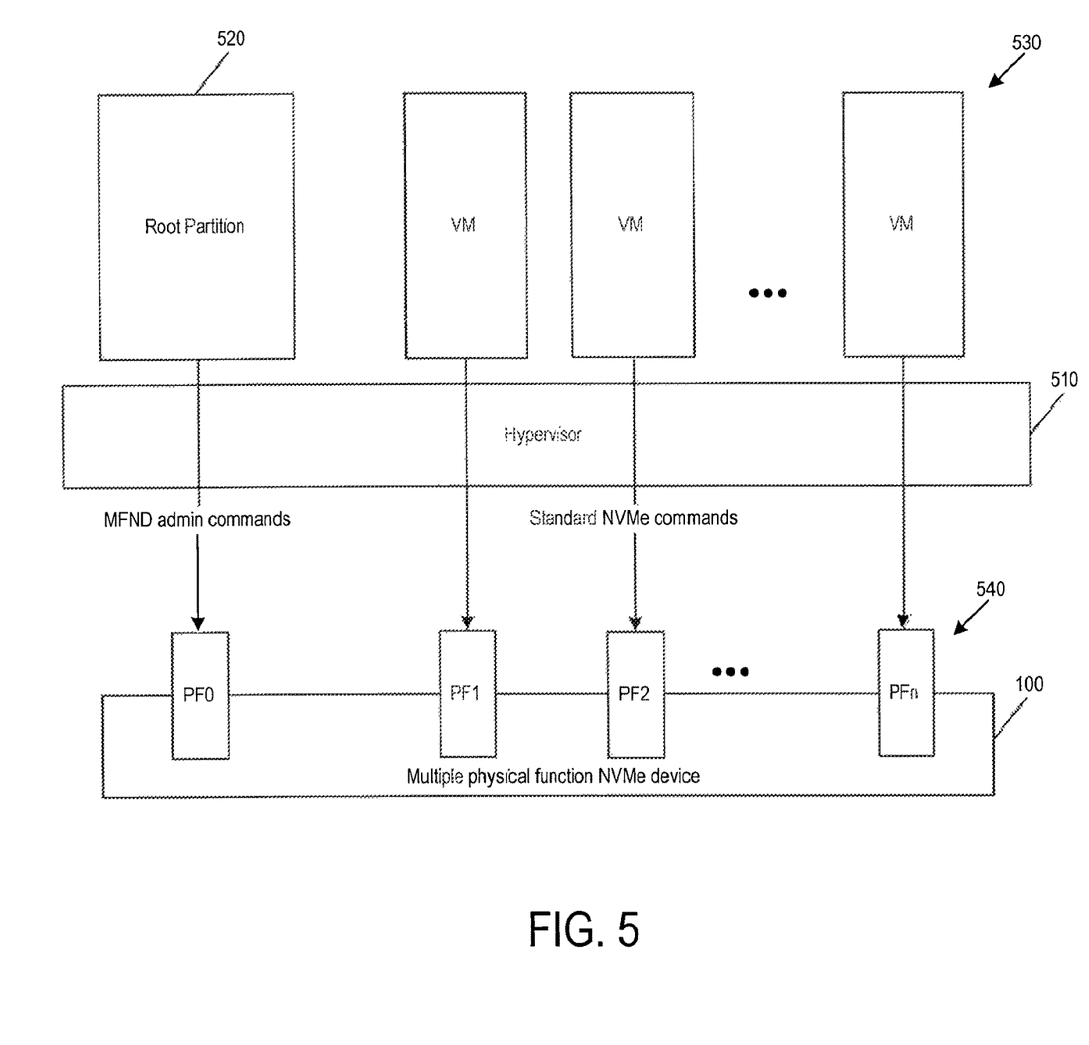
FIG. 5 is a diagram of components of a storage system and host of an embodiment when used in a multiple physical function NVMe device (MFND) environment.

A storage system operating under the NVMe specification can serve as a multiple physical function NVMe device (MFND), which is a single port NVMe device (e.g., connecting to a single host) that has more than one PCIe physical function. FIG. 5 is a diagram of some of the components of the storage system 100 and host 300 when used in an MFND environment. As shown in FIG. 5, the processor 330 in the host 300 can execute computer-readable program code to provide a hypervisor 510, a root partition 520, and a plurality of virtual machines (VMs) 530. Also, the controller 102 in the storage system 100 can provide a plurality of physical functions (PFs) PF0-PFn.

PF0 acts as a parent controller that supports commands to create/delete/modify/query other child physical functions on the same device 100. In this embodiment, PF0 is assigned to the root partition 520. All other physical functions (PF1 to PFn) are input-output controllers that behave identically to regular NVMe controllers. The root partition 520 can assign them to different VMs 530 through discrete device assignment (DDA) or NVMe Direct. One PF can be assigned to only one VM, but one VM can have more than one PF. At the initialization phase, the host 300 configures the PFs 540 and resource allocation based on the running application.

As noted above, the NVMe standard defines the mechanism of queuing a command to the device 100 in one of the supported submission queues. A submission queue entry is submitted to the controller 102 when the host 300 writes the associated submission queue tail doorbell with a new value that indicates that the submission queue tail pointer has moved to or past the slot in which that submission queue entry was placed. A submission queue tail doorbell write may indicate that one or more submission queue entries have been submitted. As discussed above, the submission queue tail doorbell register can be implemented in the device controller 102, and the host 300 writes the doorbell message into this register in order to notify the device 100 that commands are available in the associated submission queue. The submission queue tail doorbell register is implemented for each supported submission queue.

As issue can arise in the MFND environment because MFND must provide a mechanism to protect child controllers' admin queues. When a child controller is placed in this mode, admin commands are not processed as a result of writes to the admin submission queue doorbell. The write updates the value of the register but does not have the side effect of executing any commands. Instead, commands in the admin command queue are processed as a result of a command in the parent controller admin queue. This command is to be defined, but it will be equivalent to providing a new value for the admin submission queue doorbell register and will cause the child controller to execute commands as if the actual admin submission queue doorbell had been written to that value.

The following embodiments can be used to provide an MFND protection mechanism to protect child controllers' admin queues, and this mechanism can be either transparent or non-transparent to the host 300. More specifically, in one embodiment, there are two submission queue tail doorbell registers per submission queue. The dual doorbell registers may be enabled only in the admin submission queue of the child controllers. The commands are fetched and executed for a submission queue only when both doorbell registers indicate that there are pending commands in the submission queue. The device controller 102 can treat the submission queue as empty when only one doorbell register indicates that there are pending entries.

In one embodiment, the second doorbell register is visible to the host 300, and the parent host updates this register as part of the command queuing flow. The device 100 ignores the write transaction when it is not issued by the relevant parent host. In another embodiment, the second doorbell register is hidden from the host 300. The controller 102 (e.g., device firmware) writes to this register when getting an admin command from the parent host asking for command queuing. In yet another embodiment, the concept of the dual doorbell registers can be used in other use cases when two virtual machines need to confirm a command.

Figure 6:
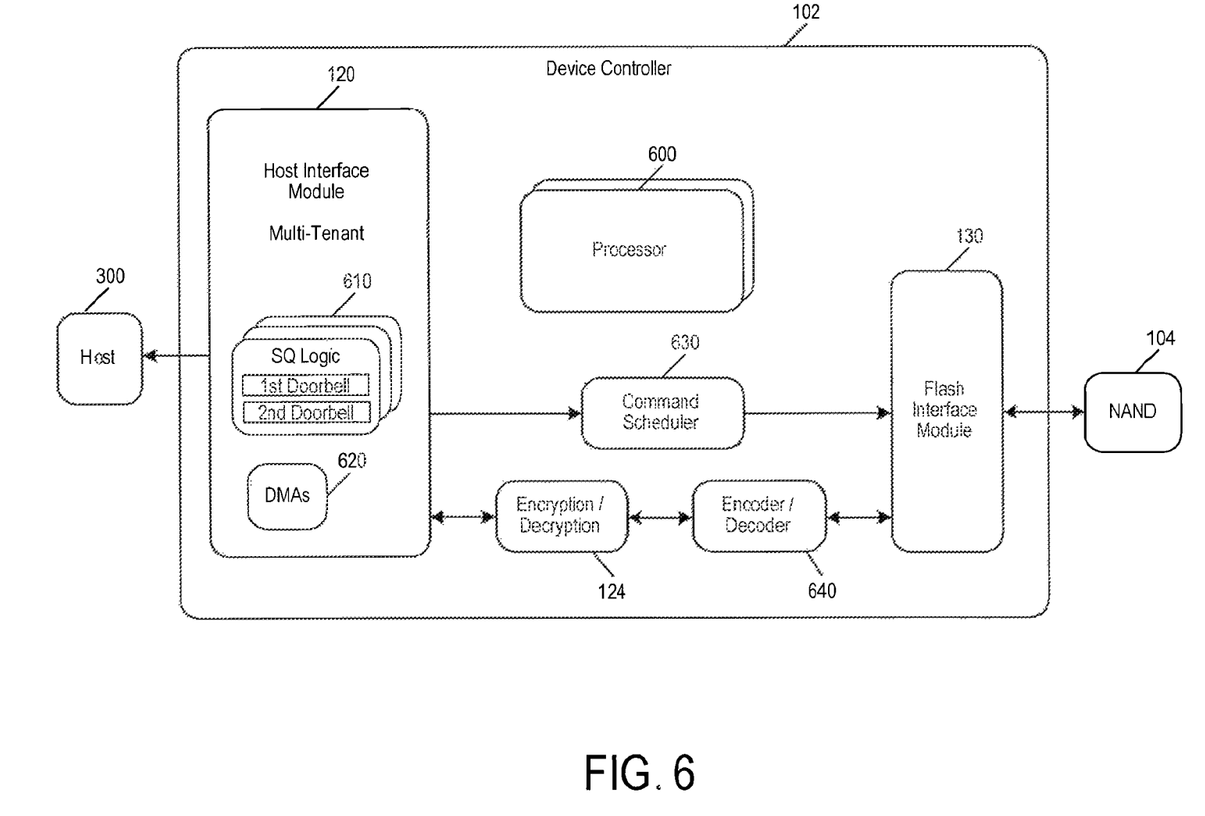
FIG. 6 is a diagram of a host and a storage system of an embodiment.

FIG. 6 is a block diagram of a storage system 100 and host 300 that illustrates this embodiment. As shown in FIG. 6, in this embodiment, the controller 102 comprises a host interface module 120, a flash interface module 130 (interfacing with the NAND memory 104), one or more processors 600, a command scheduler 630, an encryption/decryption module 124, and an encoder/decoder module 640. The host interface module 120 in this embodiment comprises one or more direct memory access (DMA) modules 520, as well as a plurality of submission queue logic modules 610.

The controller 102 in this embodiment supports use with a multi-tenant system by implementing submission queue logic 610 that is duplicated per supported submission queue. Each submission queue logic module 610 comprises dual (first and second) submission queue tail doorbell registers rather than the single register. The second dual doorbell register is optional and not used in all scenarios. In one embodiment, the second doorbell register is used when associated with an admin submission queue of one of the child controllers.

The number of available entries queued in the submission queue can be based on both doorbell registers. The number of available commands can be calculated based on the first doorbell register in one equation and based on the second doorbell register in another equation (e.g., so that the minimum number is taken).

As mentioned above, in one embodiment, the dual doorbell registers are exposed to the host 300. In this embodiment, the child host (e.g., VM) rings the first doorbell, and the parent host (e.g., root partition) rings the second doorbell. This is illustrated in the flow chart 700 in FIG. 7. It is important to note that any order of the doorbell write transactions is allowed.

Figure 7:
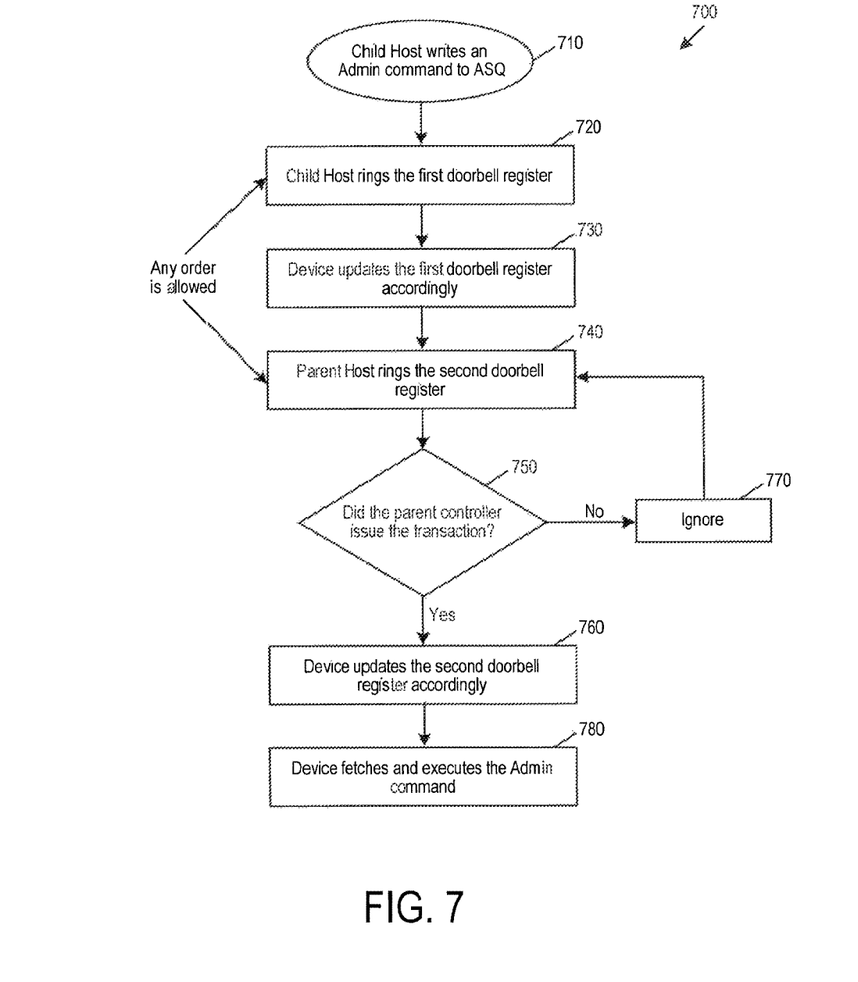
FIG. 7 is a flow chart of a method for operating a storage system of an embodiment where both dual doorbell registers are exposed to a host.

As shown in FIG. 7, the child host generates an admin command and writes it to the admin submission queue (act 710). Then, the child host rings the first doorbell register (act 720). The controller 102 updates the first doorbell register accordingly (act 730). The parent host then rings the second doorbell register (act 740), and the controller 102 makes sure that the relevant parent host issued this transaction (act 750). Only then, the second doorbell register is updated (act 760); otherwise, it is ignored (act 770). Finally, the command is fetched and executed (act 780).

In another embodiment, the second doorbell register is not exposed to the host 300 and is only used by the controller 102 (e.g., firmware) of the storage system 100. When the parent host issues the admin command validating the next commands queued in the child admin submission queue, the controller 102 updates the second doorbell command accordingly in order to reflect this request. This is shown in the flow chart 800 in FIG. 8. It is important to note that any order of the doorbell write transactions is allowed.

Figure 8:
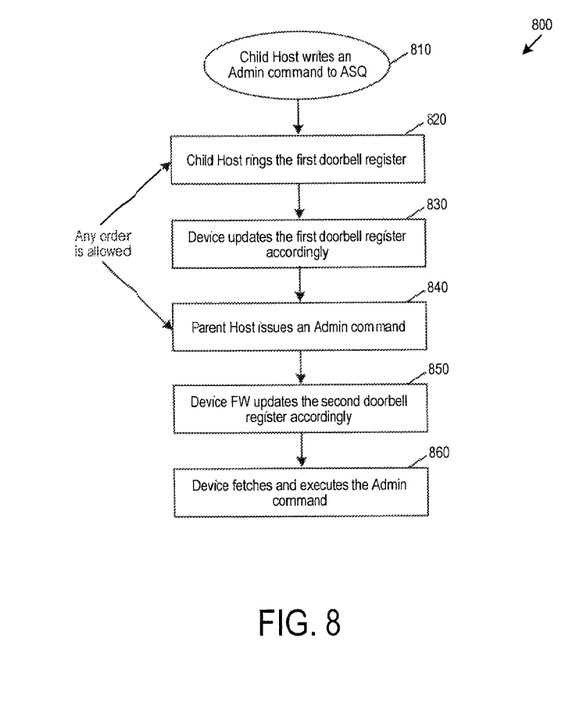
FIG. 8 is a flow chart of a method for operating a storage system of an embodiment where only one of dual doorbell registers is exposed to a host.

As shown in FIG. 8, the child host generates the admin command and writes it to the admin submission queue (act 810). Then, the child host rings the first doorbell register (act 820). The controller 102 updates the first doorbell register accordingly (act 830). The parent host issues the admin command that validated the next admin commands queued in the admin queue of the child host (act 840). Then, the controller 102 rings the second doorbell register (act 850). Finally, the command is fetched and executed (act 860).

There are several advantages associated with these embodiments. For example, these embodiments provide a simple method for having the required protection mechanism to protect child controllers' admin queues, which can be important in multi-tenant environments.

Finally, as mentioned above, any suitable type of memory can be used. Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

The memory devices can be formed from passive and/or active elements, in any combinations. By way of non-limiting example, passive semiconductor memory elements include ReRAM device elements, which in some embodiments include a resistivity switching storage element, such as an anti-fuse, phase change material, etc., and optionally a steering element, such as a diode, etc. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are examples, and memory elements may be otherwise configured.

The semiconductor memory elements located within and/or over a substrate may be arranged in two or three dimensions, such as a two dimensional memory structure or a three dimensional memory structure.

In a two dimensional memory structure, the semiconductor memory elements are arranged in a single plane or a single memory device level. Typically, in a two dimensional memory structure, memory elements are arranged in a plane (e.g., in an x-z direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and wordlines.

A three dimensional memory array is arranged so that memory elements occupy multiple planes or multiple memory device levels, thereby forming a structure in three dimensions (i.e., in the x, y and z directions, where the y direction is substantially perpendicular and the x and z directions are substantially parallel to the major surface of the substrate).

As a non-limiting example, a three dimensional memory structure may be vertically arranged as a stack of multiple two dimensional memory device levels. As another non-limiting example, a three dimensional memory array may be arranged as multiple vertical columns (e.g., columns extending substantially perpendicular to the major surface of the substrate, i.e., in the y direction) with each column having multiple memory elements in each column. The columns may be arranged in a two dimensional configuration, e.g., in an x-z plane, resulting in a three dimensional arrangement of memory elements with elements on multiple vertically stacked memory planes. Other configurations of memory elements in three dimensions can also constitute a three dimensional memory array.

By way of non-limiting example, in a three dimensional NAND memory array, the memory elements may be coupled together to form a NAND string within a single horizontal (e.g., x-z) memory device levels. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. Three dimensional memory arrays may also be designed in a NOR configuration and in a ReRAM configuration.

Typically, in a monolithic three dimensional memory array, one or more memory device levels are formed above a single substrate. Optionally, the monolithic three dimensional memory array may also have one or more memory layers at least partially within the single substrate. As a non-limiting example, the substrate may include a semiconductor such as silicon. In a monolithic three dimensional array, the layers constituting each memory device level of the array are typically formed on the layers of the underlying memory device levels of the array. However, layers of adjacent memory device levels of a monolithic three dimensional memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic three dimensional memory arrays. Further, multiple two dimensional memory arrays or three dimensional memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this invention is not limited to the two dimensional and three dimensional structures described but cover all relevant memory structures within the spirit and scope of the invention as described herein and as understood by one of skill in the art.

It is intended that the foregoing detailed description be understood as an illustration of selected forms that the invention can take and not as a definition of the invention. It is only the following claims, including all equivalents, that are intended to define the scope of the claimed invention. Finally, it should be noted that any aspect of any of the embodiments described herein can be used alone or in combination with one another.

What is claimed is:

1. A multiple physical function Non-Volatile Memory Express (NVMe) device (MFND) comprising:
   a memory; and
   a controller comprising first and second submission queue doorbell registers associated with a submission queue in a host;
   wherein the controller is configured to:
      receive a request from a child host entity to write to the first submission queue doorbell register;
      write to the first submission queue doorbell register in response to the request from the child host entity;
      receive a request from a parent host entity to write to the second submission queue doorbell register;
      attempt to verify that the parent host entity is a parent to the child host entity;
      only after verifying that the parent host entity is the parent to the child host entity, write to the second submission queue doorbell register; and
      fetch and execute a command from the submission queue in the host only in response to both the first and second submission queue doorbell registers being written.

2. The MFND of claim 1, wherein the submission queue comprises an administration command submission queue.

3. The MFND of claim 1, wherein both the first and second submission queue doorbell registers are visible to the host.

4. The MFND of claim 3, wherein the child host entity comprises a virtual machine.

5. The MFND of claim 3, wherein the parent host entity comprises a root partition.

6. The MFND of claim 5, wherein the controller comprises a parent physical function associated with the root partition.

7. The MFND of claim 4, wherein the controller comprises a child physical function associated with the virtual machine.

8. The MFND of claim 1, wherein the first submission queue doorbell register is visible to the host but the second submission queue doorbell register is not visible to the host.

9. The MFND of claim 8, wherein the child host entity comprises a virtual machine.

10. The MFND of claim 8, wherein the parent host entity comprises a root partition.

11. The of claim 9, wherein the controller comprises a child physical function associated with the virtual machine.

12. The MFND of claim 10, wherein the controller comprises a parent physical function associated with.

13. The MFND of claim 1, wherein the first and second submission queue doorbell registers are in a host interface module in the controller.

14. The MFND of claim 1, wherein the memory comprises a three-dimensional memory.

15. In a multiple physical function Non-Volatile Memory Express (NVMe) device (MFND) comprising first and second submission queue doorbell registers associated with a submission queue in a host, a method comprising:
   receiving a request from a child host entity to write to the first submission queue doorbell register;
   writing to the first submission queue doorbell register in response to the request from the child host entity;
   receiving a request from a parent host entity to write to the second submission queue doorbell register;
   attempting to verify that the parent host entity is a parent to the child host entity;
   writing to the second submission queue doorbell register only after verifying that the parent host entity is the parent to the child host entity; and
   fetching and executing a command from the submission queue in the host only in response to both the first and second submission queue doorbell registers being written.

16. The method of claim 15, wherein both the first and second submission queue doorbell registers are visible to the host.

17. The method of claim 16, wherein the child host entity comprises a virtual machine and the parent host entity comprises a root partition.

18. The method of claim 15, wherein the first submission queue doorbell register is visible to the host but the second submission queue doorbell register is not visible to the host.

19. The method of claim 18, wherein the child host entity comprises a virtual machine and the parent host entity comprises a root partition.

20. A multiple physical function Non-Volatile Memory Express (NVMe) device (MFND) comprising:
- first and second submission queue doorbell registers associated with a submission queue in a host;
- means for receiving a request from a child host entity to write to the first submission queue doorbell register;
- means for writing to the first submission queue doorbell register in response to the request from the child host entity;
- means for receiving a request from a parent host entity to write to the second submission queue doorbell register;
- means for attempting; to verify that the parent host entity is a parent to the child host entity;
- means for writing to the second submission queue doorbell register only after verifying that the parent host entity is the parent to the child host entity; and
- means for fetching and executing a command from the submission queue in the host only in response to both the first and second submission queue doorbell registers being written.

* * * * *